United States Patent [11] 3,614,774

[72] Inventor Thomas C. Clements
New York, N.Y.
[21] Appl. No. 733,392
[22] Filed May 31, 1968
[45] Patented Oct. 19, 1971
[73] Assignee Neptune Meter Company
New York, N.Y.

[54] ANALOG-TO-DIGITAL SHAFT ENCODER WITH ANTIAMBIGUITY BINARY DIGITAL CODE OUTPUT
11 Claims, 5 Drawing Figs.

[52] U.S. Cl. .......... 340/347 P, 340/364
[51] Int. Cl. .......... G08c 9/08, G08c 19/34
[50] Field of Search .......... 340/347, 332, 364; 235/154, 155

[56] References Cited
UNITED STATES PATENTS

| | | | |
|---|---|---|---|
| 3,478,346 | 11/1969 | Narukiyo | 340/347 |
| 3,484,780 | 12/1969 | Kamoi et al. | 340/347 |
| 823,164 | 6/1906 | Eble | 340/332 |
| 1,320,308 | 10/1919 | Balch | 340/332 |
| 2,902,685 | 9/1959 | Davis | 340/332 |

*Primary Examiner*—Maynard R. Wilbur
*Assistant Examiner*—Michael K. Wolensky
*Attorneys*—Robert S. Dunham, P. E. Henninger, Lester W. Clark, Thomas F. Moran, Gerald W. Griffin, Howard J. Churchill, R. Bradlee Boal, Christopher C. Dunham and John F. Ohlandt, Jr

ABSTRACT: An analog-digital converter, especially adapted for use in reading utility meters, according to which decimal digits are encoded into binary signals, the binary code being unique in that it is of constant and even parity for both the main characters, representing the normal decimal digits, and for those characters which represent ambiguous states between decimal digits. As a result, ambiguities which occur in the reading of nonindexing registers are encoded with no special logic and with the simplest possible shaft encoder.

INVENTOR.
THOMAS C. CLEMENTS
BY Lester H. Clark
ATTORNEY

ANALOG-TO-DIGITAL SHAFT ENCODER WITH ANTIAMBIGUITY BINARY DIGITAL CODE OUTPUT

BACKGROUND, OBJECTS AND SUMMARY OF THE INVENTION

This invention relates to analog to digital converters, and more particularly, to improvements in a shaft encoder type of analog to digital converter and in the system of which the encoder forms a significant part.

The encoder device of the present invention is especially adapted for use with a utility meter, that is to say, it is constructed to be mounted on a meter, such as the conventional watt-hour meter, and to be actuated by the movement of the shaft of such meter to convert the dial indicator readings of the meter into binary coded information which may then be recorded and later processed by a computer or the like for billing purposes.

Because of the aforenoted field of application for for the present invention it is deemed helpful to give the complete background from which the present invention has emerged to provide a somewhat detailed description of the environment in which its basic principle is most readily apprehended. It will become apparent, however, as the description proceeds that the principle of the present invention is a broad one and quite generally applicable in analog to digital environments.

In the context of this particular field of meter reading, the present invention is concerned with those shaft encoders in which the physical position of a shaft is proportional to some analog input signal and a digital signal to be generated corresponding to the analog signal. The generation of the digital signal can be accomplished in a variety of ways. A typical way of generating the digital signal is that described in the U.S. Pat. No. 3,310,801 to Hood et al. This patent describes a shaft encoder in which a code disk or the like, constituted of a plurality of segments defining separate channels, is arranged to be contacted by a corresponding plurality of brushes. Moreover, the Hood et al. apparatus is adapted to the specific purpose of reading out the registers, of a plurality of meter stages. In the Hood et al. system the Gray code is used for encoding the required information. In order to resolve certain ambiguities, a separate interpolation channel is provided, which channel is divided into five separate conductive segments so as effectively to resolve the ambiguities present in the meter reading operation.

The basic ambiguity difficulty presented by the meter reading operation resides in the fact that adjacent numbers will, owing to the nature of the encoding process, be encoded together at certain points on the encoder circle. It is necessary to provide some means to sense these ambiguous states or conditions and to provide one additional binary digit when they occur. An additional bit is required because the information content of the ambiguous/nonambiguous condition is exactly one bit.

The extra bit is provided in the aforenoted Hood et al. U.S. Pat. No. 3,310,801 by structural modification of the code disc. That is to say, the four-bit Gray code for the decimal information is modified by adding the so-called interpolation channel on the code disc, thus arriving at a 5-bit code.

It should be understood in connection with the foregoing description that the structural modification of the code disc as a solution to the ambiguity problem is not necessarily the only previously known solution. However, this approach is the most germane one to the consideration of the present invention.

It has been discovered by me that an encoding scheme can be successfully developed which leads to the ultimate simplicity in structure for the encoder device, as well as for the equipment associated with the encoder, with a consequent great reduction in shaft loading. This results from the elimination of the multiplicity of contactors or brushes heretofore generally employed as moving elements to make contact with the encoder mechanism.

Accordingly, it is a primary object of the present invention substantially to reduce wear and tear on parts, and to make for a vastly simpler encoding operation.

Another object is to simplify the encoder mechanism which is the component used in great numbers in automatic meter reading schemes.

At the heart of the concept of the present invention is the selection of such a digital code as will overcome the problems presented by the ambiguity states or conditions found in the encoding process with shaft encoders. Essentially, the code is advantageously selected so that the ambiguous states are simply the logical conjunction of the main binary characters corresponding to the decimal information being handled.

The unique code of the present invention has a minimum number of digits for the job to be done and it leads to economical gate structures for the hardware in which it is implemented. Furthermore, the coding scheme of the present invention provides compatibility between those systems wherein ambiguity problems are present and those in which they are not present. In other words, the information emanating from different kinds of meter registers is handled in the same way, which is to say it is read and recorded alike, whether the information be coming from indexing registers where there is no ambiguity problem, or from nonindexing registers.

For an appreciation of the unique code of the present invention some consideration ought first to be given to previously known digital codes. The most common code is the binary coded decimal or BCD. It has the attributes that it has the minimum number of digits per unit of information carried per character and it is weightable. (By "character" is meant the same as the term "member" which was used previously, except now there is the added attribute that the member is carrying information. Thus, a "character" is a member that has been assigned a place in the code). However, it requires a gate leg per digit, that is, for every bit. Thus, to decode a 5-bit binary code requires five legs per decode gate.

Other codes less commonly used are variations on the binary code such as the excess-3 or Gray code, alluded to previously, sometimes used in shaft encoders, and modified, as noted where the ambiguity problem arises. Other codes are the constant-bit-number combinational codes such as the 2-out-of-5 code used by the Bell System to encode (with five musical tones) the 10 digits of the dialing system. The latter codes have the advantage that they are constant-parity codes, as opposed to BCD, for example, which is not. To make BCD constant-parity, it is necessary to add an additional bit. Practically all useful codes fall into one ore more of these categories, or their derivatives by way of combination.

In accordance with the present invention the binary code selected is a constant-parity code; that is, each character consists of a like number of "1's." Moreover, the code is of even parity; that is, each character has an even number of "1's." In effect, it may be said to be a compound combinational code with the aforesaid parity. It is a specific feature of the present invention that a 2-out-of-6 code is combined with at least a 4-out-of-6 code. However, in some cases a 6-out-of-6 code is provided as will be explained. In brief, then, what is realized in structural terms is a binary code generating means which generates a 2-out-of-6 binary code character corresponding to each decimal digit to be handled and combines therewith the generation of a 4-out-of-6 character corresponding to each of ambiguous states. Thus, the ambiguous states are uniquely defined by the logical conjunction in binary form of these adjacent decimal digits. In other words, the principal characters are so selected in the 2-out-of-6 code that when they "conjunct" or are OR'ed together, there is produced, ipso facto, a unique 4-out-of-6 character.

Although in several illustrative examples, a number of specific binary coded characters will be assigned to the decimal digits of interest, it will be made abundantly clear that the coding scheme of the present invention is not necessarily restricted to one or more assignments of particular characters so long as the code conforms to the general criteria set forth immediately above. In fact, it has been found that 2,500 or so different assignments of code characters can be made within the ambit of the coding scheme of the present invention.

It will be appreciated that a novel feature of this invention resides in the fact that in the 2-out-of-6 code of the present invention each character is selected so that adjacent characters have their "1's" in distinctive bit positions. In other words, no character has a "1" in the same bit position as an adjacent character. As a result, when there is the contemplated conjunction of adjacent primary characters which occurs at the ambiguous states, these distinctive "1's" in coming together, ipso facto, form the unique set of "1's" for the 4-out-of-6 code character representative of that particular ambiguous state.

The foregoing and other objects, features and advantages of the invention will be apparent from the following more particular description of preferred embodiments of the invention, as illustrated in the accompanying drawings.

DESCRIPTION OF PREFERRED EMBODIMENTS

Referring now to the figures, there is illustrated the implementation of the unique code generating scheme of the present invention as applied in a particular embodiment for the purpose of meter reading. As is well known, various schemes and systems have been devised for reading meters, such as watt-hour meters, which are conventionally installed in homes and other buildings, with the objective in mind that a record may be made that it is free of human visual errors. Such reading schemes are also useful for avoiding the necessity of entering the building to read the meter visually. In accordance with some of these systems the ability to read the meter visually is still retained despite the provision for automatic reading. For the purpose of automatic reading the meter man carries a meter reading and recording device with may be attached simply by plugging into a suitable receptacle so as to make electrical contact with an encoder device that responds to the shaft position of the meter to be read.

A typical meter reading system that has been known in the prior art is the one described in U.S. Pat. No. 3,006,712 to Eichacker.

Figures 1, 2:
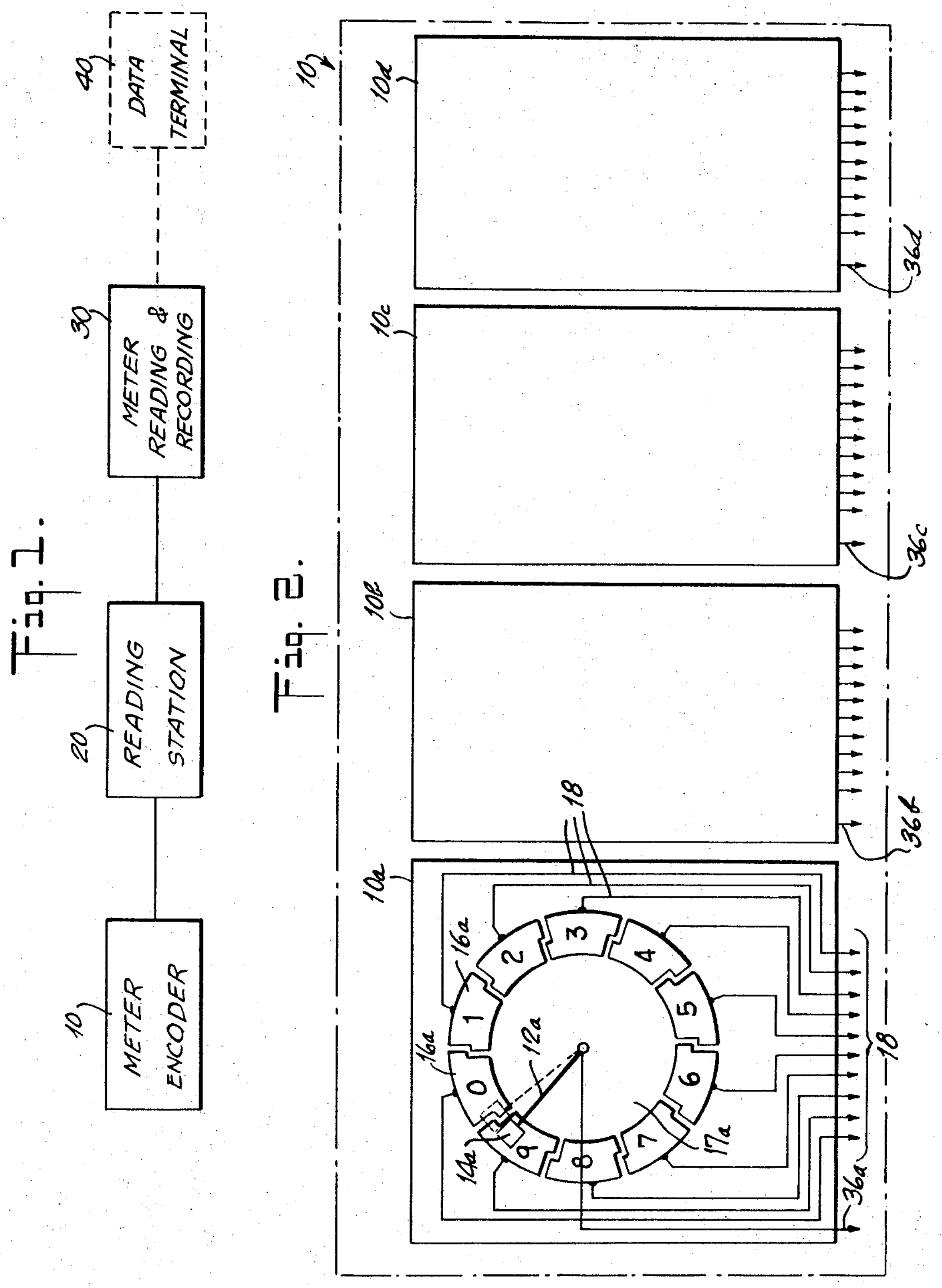
FIG. 1 is a block diagram of the general layout of a complete system for meter reading and recording, including a data terminal at which the recorded meter reading is "read out" for billing purposes.
FIG. 2 is a schematic diagram illustrating in some detail a typical meter encoder in accordance with the present invention.

The particular embodiment of applicant's invention as illustrated by the block diagram of FIG. 1 is similar to some respects to the Eichacker system. The system as shown as comprising the four blocks designated 10, 20, 30 and 40. The data terminal 40 is shown in dotted lines since this equipment is used separately, i.e. only when the recorded information is to be taken from the apparatus 30.

An essential difference that should be noted is that the present invention implements a unique code generating means and thereby substantially reduces the structure of the encoder mechanism per se. Furthermore, it conceives of a constant contact arrangement for the encoder device, that is to say, it keeps in mind the practical necessity of continuous monitoring of the meter shaft position and provides means for overcoming the ambiguities inherent in such constant contact.

In the embodiment illustrated in FIG. 1, it is, of course, contemplated that the encoder device be readily fitted or connected to the conventional meter in such a way as to permit the automatic reading of the meter dials.

Thus, referring now to FIG. 2, it will be understood that the wiper contact 12*a* forming part of the encoder 10*a* is adapted to be driven by the normal or conventional shaft of the meter to be monitored. The contact 12*a* has a brush 14*a* which makes contact with the spaced segments 16*a* when the wiper contact or 12*a* is rotated by the meter shaft.

Similar encoders 10*b*, 10*c* and 10*d* are provided as part of the total meter encoder arrangement shown in the box designated 10. It will be understood that these other similar encoding elements will perform the same essential functions as encoder element 10*a*. For the sake of simplicity, they are not drawn in their entirety.

The meter encoder 10 with all of its essential elements constitutes one part of the binary code generating means of the illustrated embodiment. It will be appreciated that this meter encoder 10 is of extremely simple construction. Since many hundreds of thousands of encoders are contemplated for a meter reading and recording operation on a systematic basis, the simplification of this device leads to great economies.

The other essential part of the binary code generating means for implementing the code of the present invention is the encoding network 32 which is installed in a meter reading and recording apparatus 30. The encoding network 32 is essentially the same as would be utilized in connection with any other code. In other words, the antiambiguity feature of the code selected in accordance with the present invention can be ignored in designing the network. The selected code is totally compatible with nonambiguous systems, i.e. those employing indexing registers. Consequently, when the code is used with such systems the same meter reading and recording apparatus 30 can be used. The only difference, as will be described in detail hereinafter, is that the logic in the data terminal 40 is different. (The data terminal is the terminal which accepts information from the apparatus 30 when it is desired to provide a final readout for billing purposes). In other words, at this data terminal the decoding logic, which is used only when the particular meter information contains ambiguities, can be omitted. It will be apparent that this makes for flexible and simple arrangement. In other words, the antiambiguity feature becomes a standard feature at no extra cost for the apparatus 30. Also, no complicated logic circuits need be built into the apparatus 30 because it is inherent in the selected code.

The apparatus 30 is carried by the meter reader and is a one-of-a-kind item in effect. Illustrated as being included in the apparatus 30 are the recording devices 34 comprising, in schematic form, a plurality of tracks T1–T6. Shown connected in common to the reading devices 34 is equipment designated 36, which includes a power supply and suitable controls. This equipment furnishes the needed power selectively for reading out the plurality of required circuits. The controls provide a means of selecting in sequence the particular meter register of the meter for reading rather than requiring a greater multiplicity of conductors for this purpose. However, the concept of the present invention is not limited in any way to the particular means of reading out the meter dials, and such reading out may be accomplished by some other suitable means.

The complete circuits for digital "read out" of the meter are established by way of the individual outgoing line 36*a* which is connected to the power supply of source 36. The complete circuit for reading one meter register may be traced to the center point of the wiper contact 12*a* of encoder element 10*a*. Thence, the circuit is through brush 14*a* and the particular segment or segments with which the brush happens to be in contact, and thence by way of the common return lines to the respective recording devices 34, returning to the source 36.

When it was noted that the return lines are "common," this was meant to indicate that in the embodiment being described, rather than having an excessive number of return lines, the plurality of encoder elements 10*a*, 10*b*, 10*c* and 10*d* all utilize the lines 18. Similar individual outgoing lines 36*b*, 36*c* and 36*d* which are not shown completed in FIG. 3, extend to the respective encoder elements 10*b*, 10*c* and 10*d* for the same purpose and in the same manner as was explained for line 36*a*.

Figure 3:
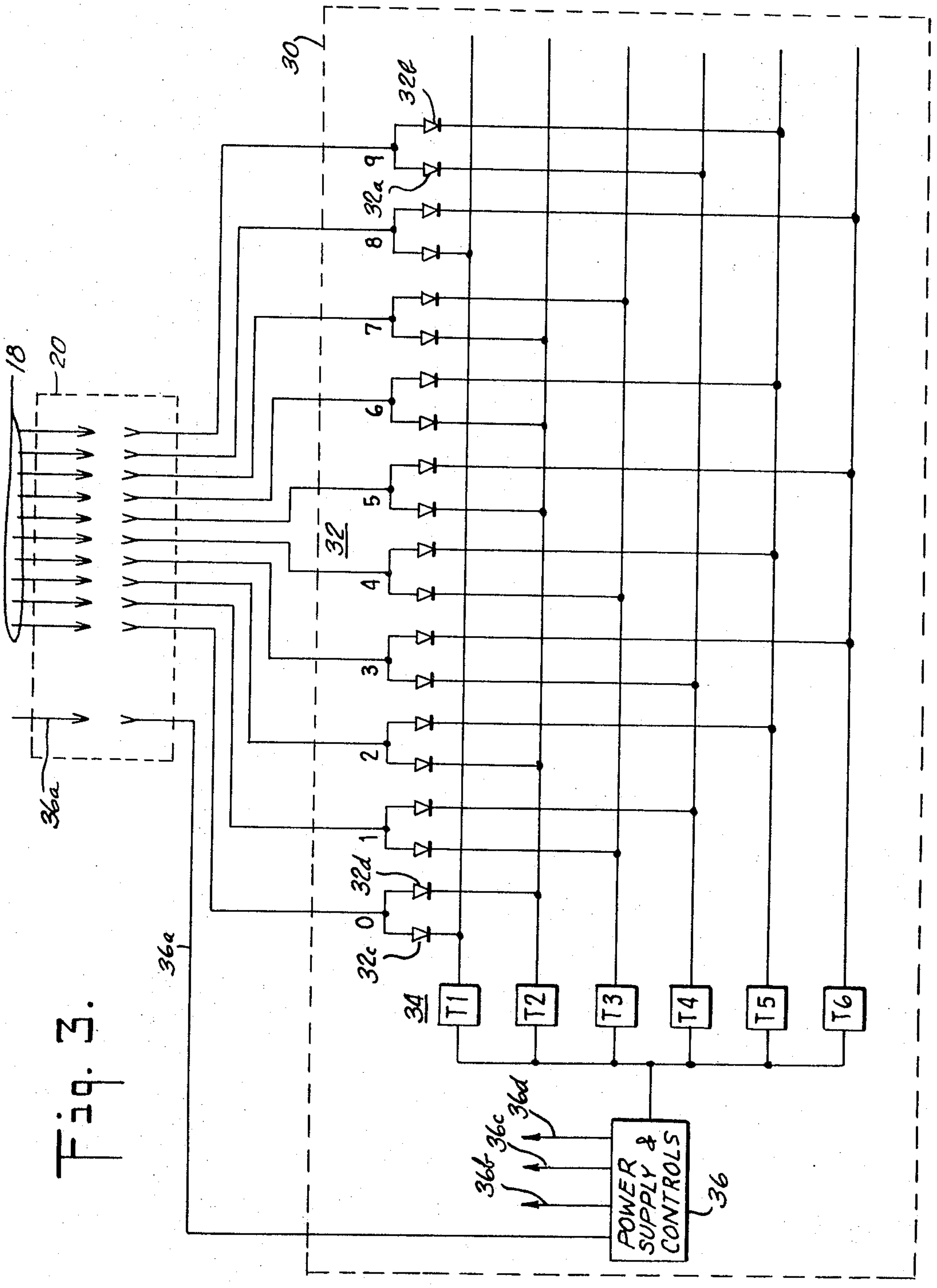
FIG. 3 is a schematic diagram of the reading station and the meter reading and recording apparatus.

The circuits described are "made," that is, they are completed when the connection is made at the reading station 20, shown in FIG. 3. In other words, a suitable plug and receptacle arrangement is provided at the reading station 20 for the necessary circuit completion.

Returning now to FIG. 2, and more particularly, to the structural configuration of the encoder element 10*a* and its particular connection in the system, it will be noted that the conductive segments 16*a* are arranged in annular form in a disc 17*a*. Adjacent segments have their ends overlapping and this is for the purpose of insuring that the brush 14*a*, even though it is narrow, is always in contact with at least one segment. Moreover, it is insured that the brush 14*a* maintains contact with a predetermined segment until establishing contact with the next or succeeding segment. Thus, there are not possible hiatuses or gaps in the encoding circle, unlike previously known arrangements.

Most importantly, the encoder device or element 10*a* is a vastly simplified one in that it provides a digital read out of all decimal digits while requiring only the ten segments illustrated in a single conductive ring or annulas. Moreover, this simple 10-segment encoder enables the readout of ambiguous positions without elaborate structural modification.

Now let there be considered the operation of the binary code generating means of the present invention as it is applied to the reading of a typical register stage of a utility meter. Let us suppose that the wiper contact or 12*a* is located in three separate positions: firstly, in reading the decimal digit 9, then the ambiguous state 9–0, and then digit 0. In the first instance, of course, the brush 14*a*, positioned as shown in the solid lines in FIG. 2, will read out the value 9. This will be appreciated by reference to table I below.

TABLE I

| Decimal Digit | Binary Coded Character | Ambiguous Conjunction |
|---|---|---|
| 0 | 110000 | |
| | | 111100 |
| 1 | 001100 | |
| | | 011110 |
| 2 | 010010 | |
| | | 010111 |
| 3 | 000101 | |
| | | 001111 |
| 4 | 001010 | |
| | | 011011 |
| 5 | 010001 | |
| | | 110011 |
| 6 | 100010 | |
| | | 111010 |
| 7 | 011000 | |
| | | 111001 |
| 8 | 100001 | |
| | | 100111 |
| 9 | 000110 | |
| | | 110110 |

Thus, a circuit will be completed by way of line 36*a* through the wiper contact of 12*a*, the brush 14*a*, and returned by way of a line 18 connected to the particular segment 16*a* representing a 9. The completed path will be by way of the diodes 32*a* and 32*b*, and thence to the recording devices T4 and T5, respectively, which will record ones in these bit positions. Of course, zeros will be recorded in the other bit positions. This may be verified by reference to table I.

However, if the situation is such that the brush 14*a* overlies adjacent segments, that is, as depicted by the dotted lines, it is in contact with the end of the segment representing a 9, and is also in contact with the adjacent end of the segment representing a zero, then, not only will the recording devices T4 and T5 be energized to record "1's," but the devices T1 and T2 will also record "1's." This result is effected because there is an additional set of current paths available by way of the line 18, connected to the zero segment, and through the diodes 32*c*, 32*d* to the respective recording devices T1 and T2. Again, the code can be verified by reference to the table. Particular note should be taken that there is no means required at the recorder for resolution of then described ambiguous state or condition. This means that nothing need be done until the data is finally to be processed. Rather, the data reflecting this condition can be recorded as presented, that is, as the simple, logical conjunction in binary form of adjacent decimal digits.

Although it will be apparent from inspection of FIG. 3 that the encoding network 32 therein exactly implements the code of table I, a great number of implementations corresponding to the particular code selected can be made. As noted before, a great number of specific codes can be selected within the general criteria already set forth. Just as an example of another specific code that can be utilized, is the one that is herewith shown in table II.

TABLE II

| Decimal Digit | Binary Coded Character | Ambiguous Conjunction |
|---|---|---|
| 0 | 000011 | |
| | | 001111 |
| 1 | 001100 | |
| | | 011110 |
| 2 | 010010 | |
| | | 111010 |
| 3 | 101000 | |
| | | 111100 |
| 4 | 010100 | |
| | | 110110 |
| 5 | 100010 | |
| | | 110011 |
| 6 | 010001 | |
| | | 010111 |
| 7 | 000110 | |
| | | 100111 |
| 8 | 100001 | |
| | | 111001 |
| 9 | 011000 | |
| | | 011011 |

Having described the meter reading and recording operation which involves the meter encoder 10 and apparatus 30 functioning by way of the reading station 20 so as to provide readout of a given meter, attention is now turned to the processing of this information as recorded. This involves the connection of the apparatus 30 which contains the recorded information to the data terminal 40. In the event that the information relating to the metered quantities contains ambiguities, that is to say, the information is derived from a nonindexing register or the like, the ambiguities must be removed or resolved so that an accurate presentation of the information may be provided for billing of a customer.

Figures 4, 5:
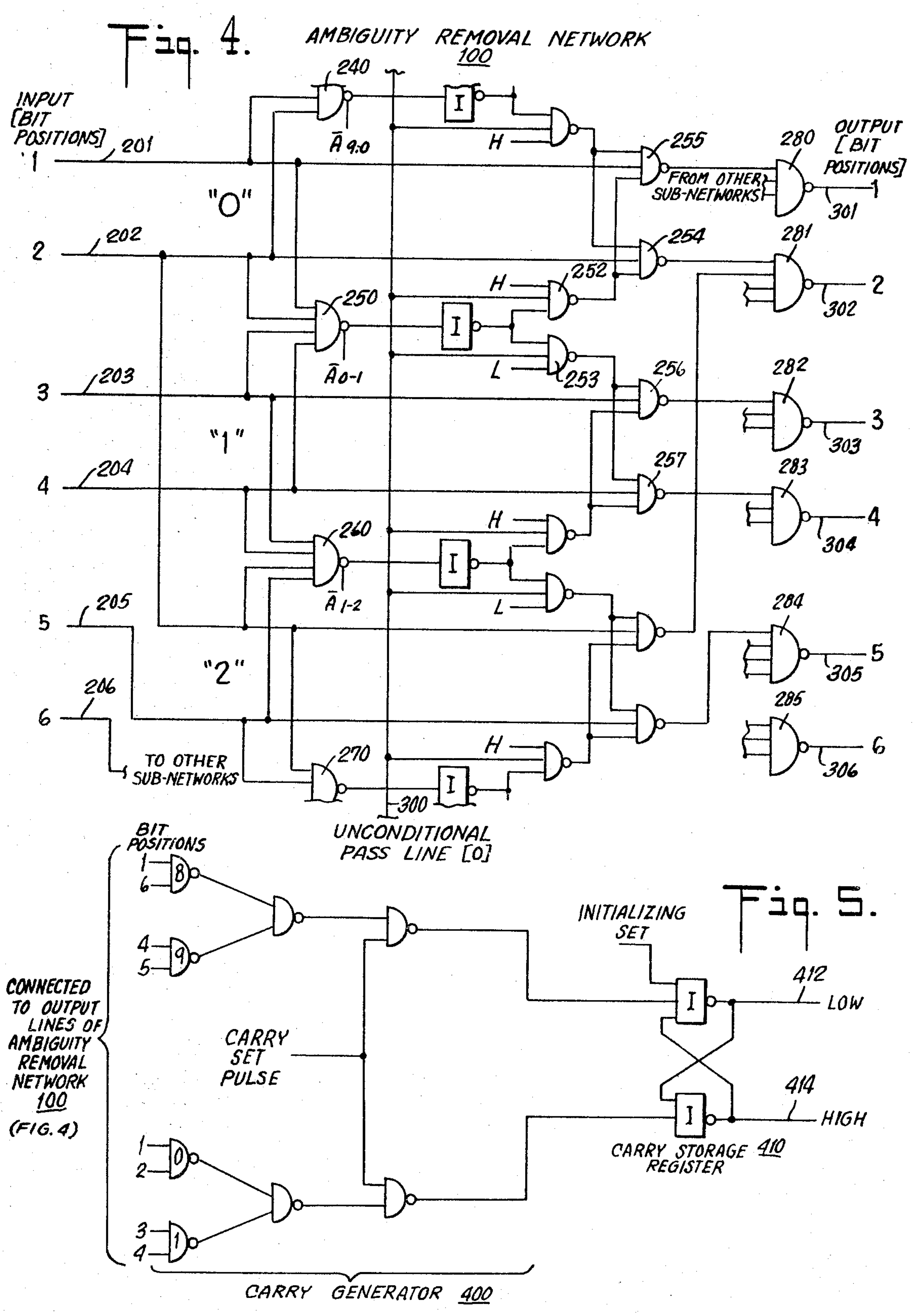
FIG. 4 is a schematic diagram of a portion of the ambiguity removal network employed at the date terminal.
FIG. 5 is a schematic diagram of the logic that generates and stores a "carry," such being utilized in conjunction with the ambiguity removal network.

Referring now to FIGS. 4 and 5, the ambiguity removal network 100 shown in FIG. 4 and the associated logic circuitry shown in FIG. 5 will be explained. The ambiguity removal network 100 comprises a group of subnetworks which are 10 in number and each is provided with a plurality of logic gates for the purpose of removing the 10 ambiguous states or conditions that have been recorded in binary coded form. Such removal of the ambiguity states is accomplished for each decimal digit in turn, based upon decisions made on previous decimal digits received.

It will be recalled, particularly by referring again to table I hereinabove, that for each decimal digit there was developed a unique binary coded character; furthermore, a unique binary character was developed representing each of the ambiguity states.

It will be seen in FIG. 4, which illustrates a part of the total removal network, that at the left of the figure are the six binary digit or "bit" positions, numbered 1 through 6, which define the unique binary code of main characters and ambiguity characters. Since it will be apparent to one skilled in the art how the ten different ambiguity states are to be resolved, only a few of the subnetworks have been illustrated in FIG. 4.

It must be borne in mind that there are three possible combinations when the removal or resolution of ambiguities is required. These are:

1. The next digit is expected to be ambiguous, and if it is it should be rounded to its highest state.
2. The next digit is expected to be ambiguous, and if it is it should be rounded to its lowest stage.
3. The next digit is expected to be nonambiguous.

Arising out of the mechanical nature of the encoder, the choice between these states is made on the basic of what the present decimal digit actually is:

1. If it is a 0 or 1, the next digit should be rounded high.
2. If it is an 8 or 9, the next digit should be rounded low.
3. If it is a 2, 3, 4, 5, 6 or 7, the next digit is expected to be nonambiguous.

The ambiguity network 100, as shown in partial schematic, removes the ambiguities based upon the above-formulated logic. The implementation is by means of NAND gates, well known to those skilled in the art. Except for the inverters (symbolized by an I surrounded by a rectangle) all of the logic gates are NAND gates.

In the event that an ambiguity is not present, all of the NAND gates, including the gates 240, 250, 260 and 270 are open, and whatever binary code character is presented at the input is passed through unchanged, emerging from the respective output gates 280–285 to the output lines 301–306.

Taking a specific case, let it be assumed that an ambiguity is not present and that a decimal 0 is being read out from the apparatus 30 into the data terminal 40. This means, referring to table I, that binary "1's" are present at the input to network 100 in bit positions 1 and 2. Thus, binary "1's" are being fed in on lines 201, 202, but binary "0's" are being fed in on the remaining input lines 203—206. Under these conditions there is no change between input and output.

Contrasted with the above situation, let it now be assumed that an ambiguity is present, and specifically, that there is an 0–1 ambiguity, such that, referring to table I, there are binary "1's" in the first 4 bit positions. Thus, there are binary "1's" appearing on lines 201–204 but binary "0's" on lines 205 and 206. As a consequence of the presence of such an ambiguity, the appropriate initial gate, i.e. gate 250, detects this presence of the "1's" on lines 201–204. Now assuming that the previous decimal digit was 9, the ambiguity is resolved in favor of the lower decimal digit. In other words, the 0–1 ambiguity is read as a decimal 0.

The above-described removal of the 0–1 ambiguity is achieved by the fact that a "low" carry has been fed to the line designated L at the input to the logic gate 253 in FIG. 4. Because of this, the gates conducting the 3 and 4 bits, that is, gates 256 and 257, will be closed, and hence, binary "1's" will appear only at the output bit positions 1 and 2, i.e., on lines 301 and 302, which correspond to a decimal 0.

Alternatively, if the carry were "high" the gates 254 and 255 which control the 1 and 2 bit positions would be closed, and the gates controlling 3 and 4 bit positions would be open, thus allowing only binary "1's" in output bit positions 3 and 4. This corresponds to allowing a decimal 1 to get through to the output.

It will be understood that if for any reason it is desired to make the ambiguity network 100 unconditionally transparent logically, it is only necessary to energize the unconditional pass line 300 with a binary "0."

Summarizing the above operation, it will have become apparent that, since each of the decimal digits is represented by a pair of binary "1's" in selected bit positions, the ambiguity removal network 100 selects, when presented with an ambiguity state represented by four binary "1's." which pair of binary "1's" will be allowed to pass through to the output as determined by whether the previous digit was a decimal 8 or a 9, in which case carry is "low," or the previous digit was a decimal 0 or 1, in which event the carry is "high."

The generation of a "high" or a "low" carry is accomplished by the circuit illustrated in FIG. 5 comprising a carry generator 400 and a carry storage register 410. The circuit is implemented completely by NAND logic blocks, denoted by the semicircles, except for the inverters in the carry storage register symbolized by rectangles.

The upper part of the circuit of FIG. 5 has its inputs connected to the output lines of the ambiguity removal network 100, such that with the occurrence of binary "1's" in the bit positions 1 and 6 representing a decimal 8, or in the bit positions 4 and 5 representing a decimal 9, a signal will be fed to the carry storage register so as to set this register, shown in the form of a flip-flop comprising cross-coupled inverters in its low state when the carry set pulse occurs.

On the other hand, referring to the lower part of FIG. 5, if the previous decimal digit was a 0 or a 1, the carry storage register 410 will be set to its high state when the "carry" set pulse occurs. The carry set pulse is caused to occur by other logic within the machine during and near the end of a character interval. The initializing set line connected to the carry storage register 410 is necessary for setting the register to its low state arbitrarily when there is no information available as to the state of a previous digit.

It will be apparent that the low and high states of the carry storage register 410 are coupled by means of lines 412 b and 414 to the logic gates 252 and 253, for the purpose of affecting the operation of these gates in the previously described manner.

It should be particularly noted that the order of occurrence of the decimal digits in the meter reading system already described is from low order to high order; in other words, from the less significant digit to the more significant digit. For example, if a reading happened to be 1,942, the digits would pass through the system in the order 2, 4, 9, 1.

The antiambiguity system of the present invention has another aspect which may also be exploited. If an ambiguity may be logically expected in a decimal digit on the basis of the range of the previous digit, but is not in fact there, it serves as an indication that the encoder, such as the meter encoder 10 already discussed producing the encoding is misaligned. It is possible to build additional logic circuitry into the system so as to detect such a misalignment, and to give suitable indications elsewhere in the system that a misalignment has occurred.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A converter for encoding decimal digits into binary coded signals, comprising a binary code generating means for generating a binary code of constant and even parity both for the main characters representing each of the decimal digits and for the ambiguous characters representing the ambiguous state between decimal digits including means for forming said main characters such that none of them has a "1" in the same bit position as an adjacent main character, and means for forming said ambiguous characters simply by the logical OR operation in binary form representation of adjacent decimal digits.

2. Apparatus as defined in claim 1, in which said binary code generating means includes means for generating a 2-out-of-6 code character corresponding to each decimal digit and for generating a 4-out-of-6 code character corresponding to each of the ambiguous states defined by adjacent decimal digits.

3. Apparatus as defined in claim 2, in which said binary code generating means generates adjacent characters in said 2-out-of-6 code which have "1—s" in distinctive bit positions whereby solely the logical conjunction of said adjacent binary coded characters produces a unique set of four "1—s" representative of an ambiguous state.

4. Apparatus as defined in claim 2, further comprising a meter register, and in which said binary code generating means comprises an encoder and an encoding network; said encoder comprising a plurality of conductive segments whose adjacent ends overlap, means for sensing the decimal digit position of a register, said means for sensing including means for continuously monitoring at least one of said segments and means for sensing two adjacent segments before terminating the sensing of one of them and beginning the sensing of the other; said encoding network being connected to said encoder for producing binary code characters of constant and even parity corresponding to the decimal characters and for producing the logical conjunction of adjacent decimal digits to provide additional binary code characters of constant and even parity representative of ambiguous states between said decimal digits.

5. Apparatus as defined in claim 2, further comprising a group of meter registers, and in which said binary code generating means comprises an encoder and an encoding network; said encoder comprising a plurality of conductive segments arranged in a ring and having portions of their adjacent ends overlapping; means for sensing in sequence the decimal digit positions of each of said group of meter registers.

6. Apparatus as defined in claim 5, in which said encoding network comprises a pair of diodes connected to each of said plurality of conductive segments.

7. Apparatus as defined in claim 5, further comprising recording means for recording the binary coded signals from each of said pairs of diodes.

8. Apparatus as defined in claim 5, in which said encoding network comprises a pair of diodes connected to each of said plurality of conductive segments, each pair of diodes being connected to a discrete combination of pairs of recording tracks in said recording means.

9. Apparatus as defined in claim 8, in which those pairs of said diodes which are connected at their first ends to adjacent segments on said encoder are also connected at their opposite ends to distinctive pairs of recording tracks.

10. In an analog-digital converter, an encoder adapted to be affixed to a meter register, said encoder comprising a ring-shaped plurality of conductive segments whose adjacent ends overlap, and further comprising means adapted to be energized electrically for continuously contacting at least one of said segments and for contacting a pair of adjacent segments before terminating the sensing of one and beginning the sensing of the other; an encoding network connected to said encoder for producing binary code characters of constant and even parity for the main decimal digits responsive to contacting each of said conductive segments and for producing binary code characters of constant and even parity for ambiguous states between decimal digits responsive to contacting pairs of adjacent conductive segments, including means for producing said binary code characters for the main decimal digits such that none of them has a "1" in the same bit position as an adjacent character, and means for forming said binary code characters for said ambiguous states by the logical OR operation of the binary code characters representing adjacent decimal digits.

11. Apparatus as defined in claim 10, in which said encoding network is connected to said encoder for producing a 2-out-of-6 code character, corresponding to each decimal digit, responsive to contacting each of said conductive segments, and for producing a 4-out-of-6 code character, corresponding to each of the ambiguous states defined by adjacent decimal digits, responsive to contacting adjacent conductive segments.